C. PEARSON AND G. C. ST. LOUIS.
AEROPLANE.
APPLICATION FILED APR. 18, 1918.
1,355,256.
Patented Oct. 12, 1920.
5 SHEETS—SHEET 3.
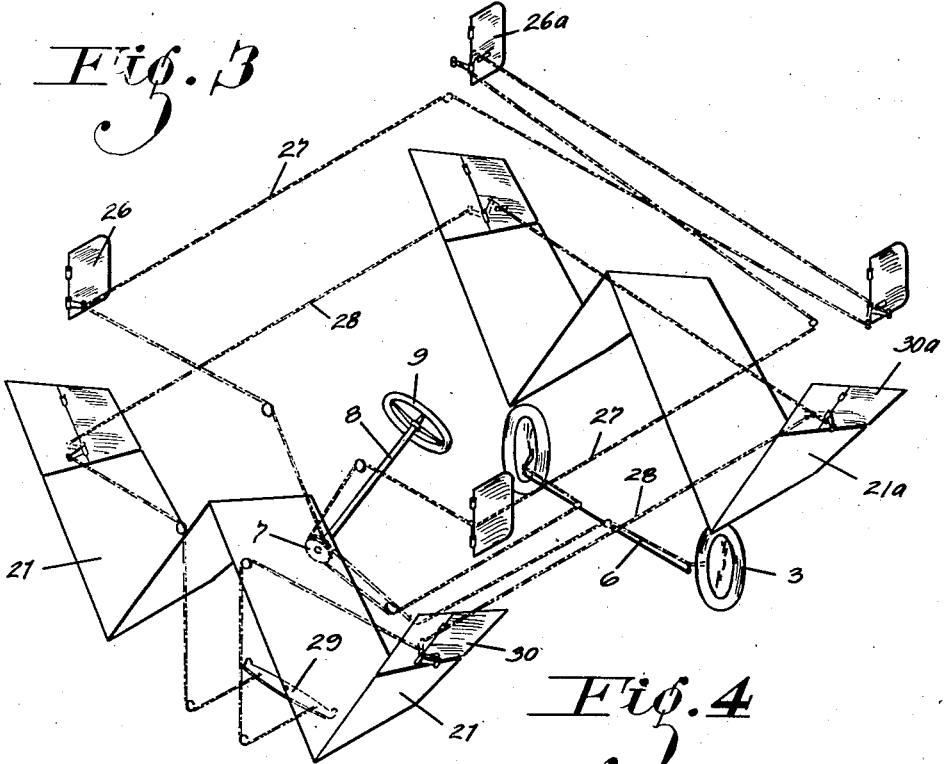
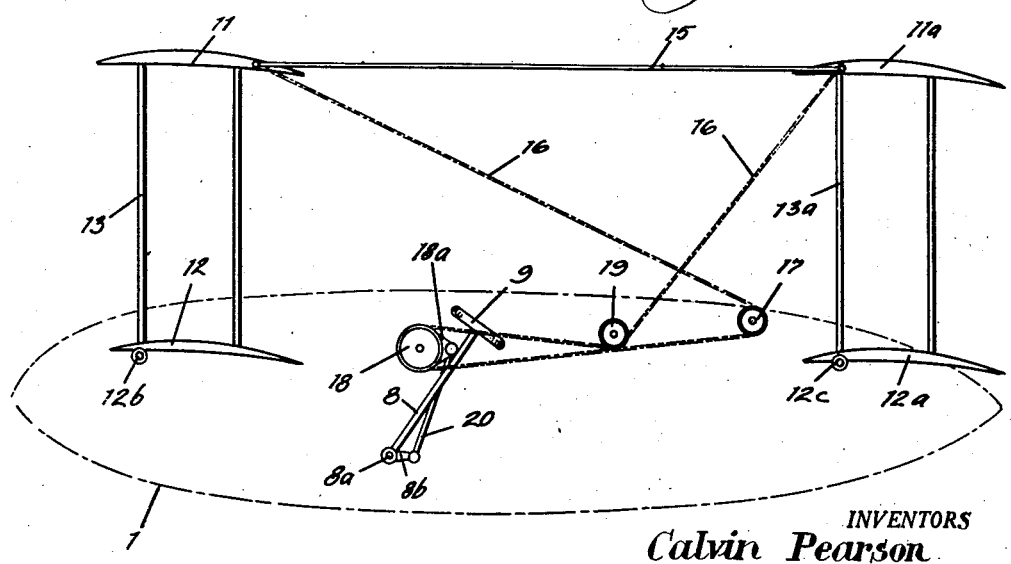
INVENTORS
Calvin Pearson
George C. St Louis
S. Webster ATTORNEY

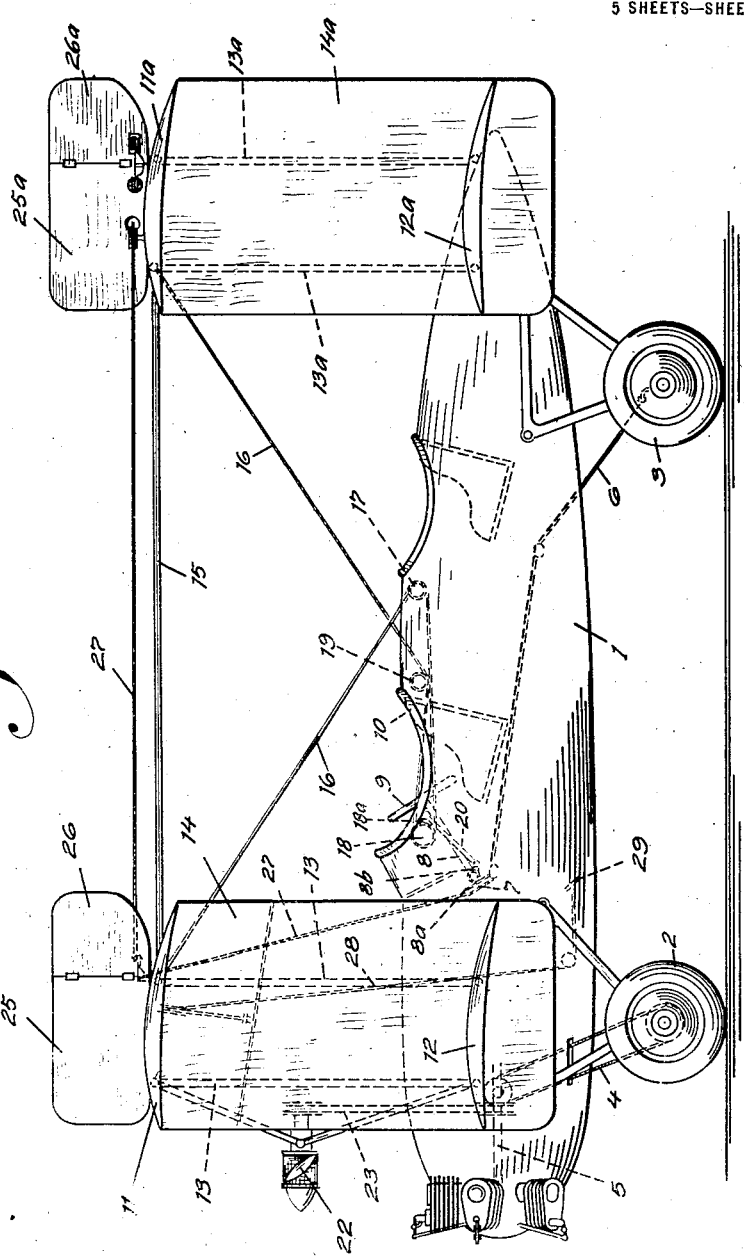

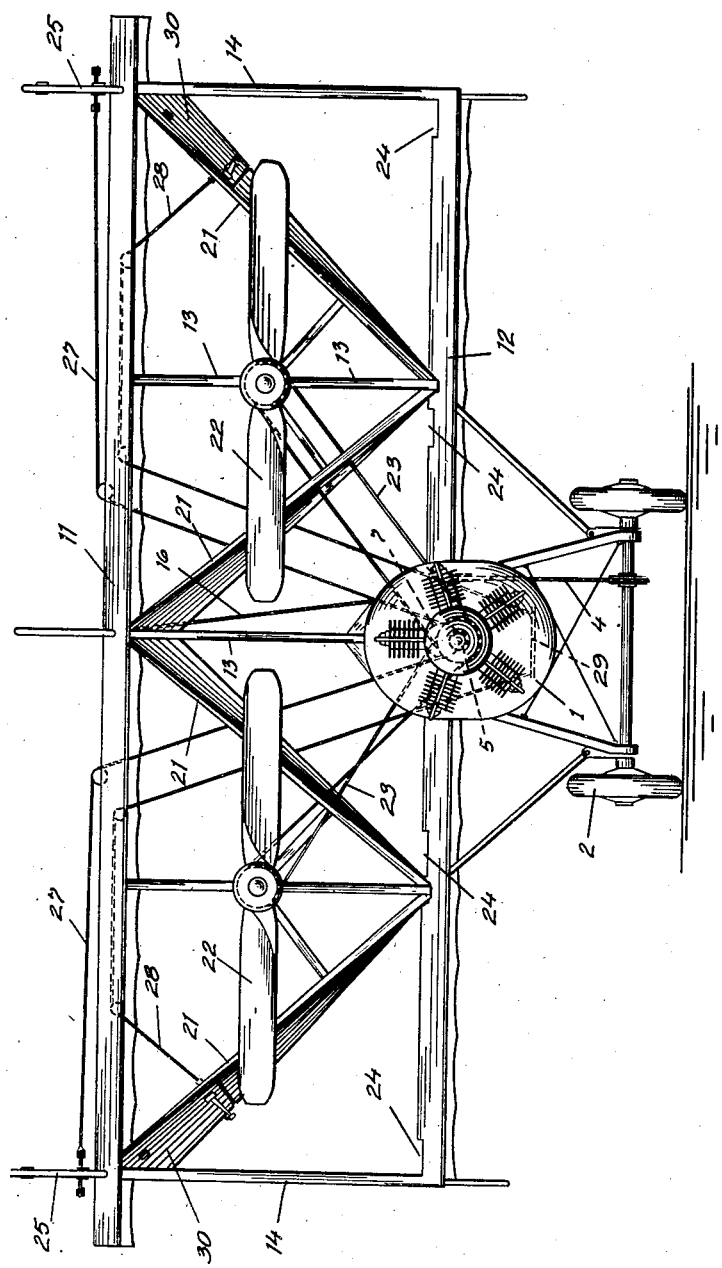

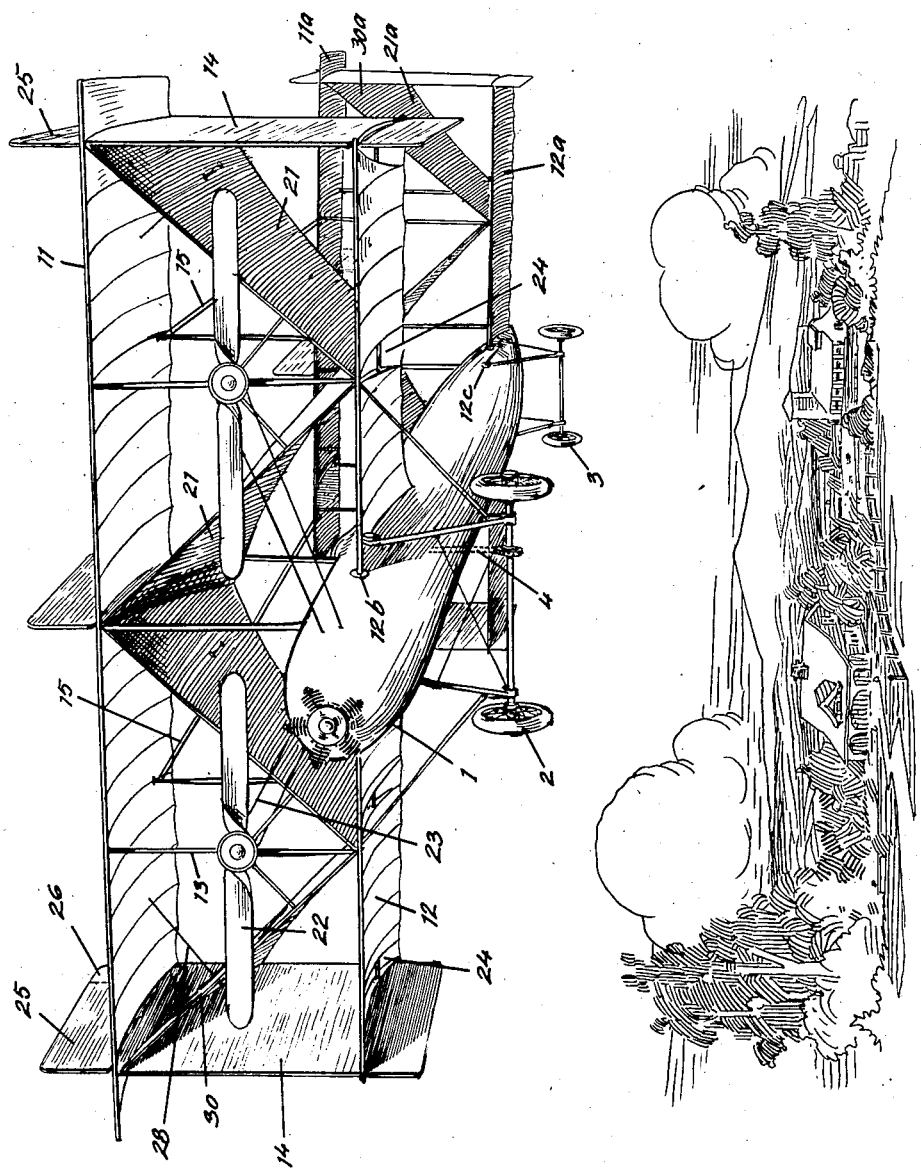

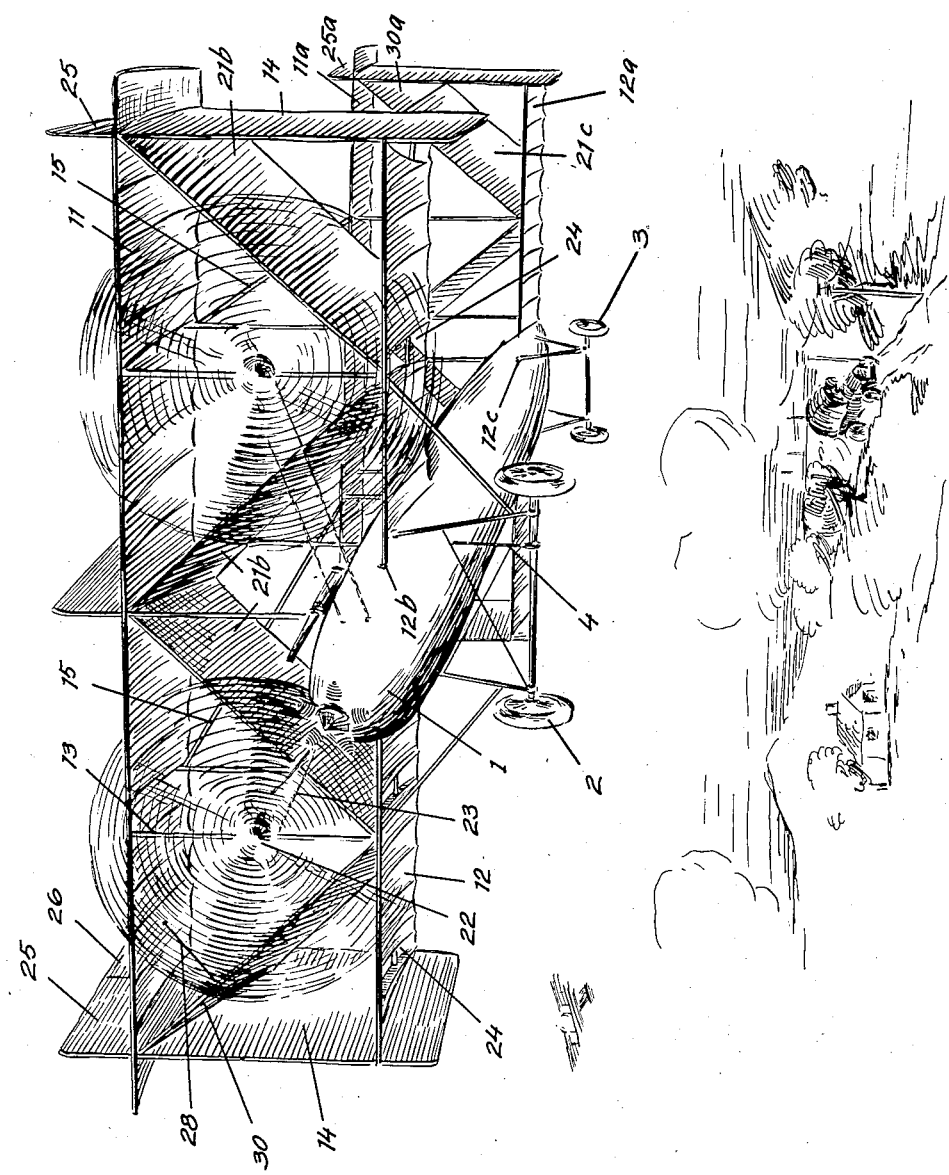

UNITED STATES PATENT OFFICE.

CALVIN PEARSON AND GEORGE C. ST. LOUIS, OF FRESNO, CALIFORNIA.

AEROPLANE.

1,355,256.    Specification of Letters Patent.    Patented Oct. 12, 1920.

Application filed April 18, 1918. Serial No. 229,370.

*To all whom it may concern:*

Be it known that we, CALVIN PEARSON and GEORGE C. ST. LOUIS, both citizens of the United States, residing at Fresno, in the county of Fresno, State of California, have invented certain new and useful Improvements in Aeroplanes; and we do declare the following to be a clear, full, and exact description of the same, reference being had to the accompanying drawings, and to the characters of reference marked thereon, which form a part of this application.

This invention relates to improvements in aeroplanes and particularly with respect to that type shown in Patent No. 1,195,290, dated the 22nd day of August, 1916; and the application filed May 15th, 1916, Serial No. 97,533.

The object of the invention is to provide an aeroplane which can be readily used for commercial and general purposes; one which can light upon, travel along and arise from roadways or other places of limited environs instead of requiring special landing and starting fields as is now the case; one which can arise and alight at low speed; one which can lift a maximum useful load and require a minimum weight of power plant and structure and be also of minimum overall lateral dimensions; and lastly, to provide a machine having inherent and automatic stability, and one requiring, therefore, but a limited number of balancing controls whereby the operator may quickly learn to drive and manage the same, instead of being required to put in months of training as is now a pilot's duty, to insure safe driving.

To accomplish the above, we provide biplanes arranged in tandem; we cut down the overall width of the main planes and compensate for the loss of lifting surface by interposing cambered interplanes arranged in alternately disposed inclinations to the horizon between the main planes, and these supply also the necessary bracing struts, thus decreasing head resistance and adding lifting power instead. This latter embodies the idea of the cellular lifting curtains or boxes shown in our previous patent application noted above. We then provide a streamline body suspended below and attached to both biplane units through hinged connections. The body will carry the power plant, personnel, fuel, oil, etc. The center of gravity of the body load is well below the center of lift, and this therefore functions as an inherent automatic static stabilizer. A simple system of positively controlled stabilizing elements are also provided as will appear. The hinged connections between the biplane units and the body, coupled with the means for controlling the same, provide a means for varying the angle of incidence while in flight so that the body will be horizontal under all ordinary flight conditions.

By a clutch arrangement, the motor can be connected with either the aerial propellers or with the road wheels at will. This allows of the machine being propelled through the air in aeroplane fashion, or along the road in the manner of an automobile. When the motor is started, it can be disconnected from either of the transmission devices. The driving wheels are provided with a differential or equivalent device which compensates for the velocity differences met with when driving along the road.

In flight, the machine is steered in a horizontal plane by means of balanced rudder surfaces, and when running on the road the steering is performed by suitably pivoted rear wheels. The rudders and the wheels are interconnected with an automobile type steering column so that they act in unison. This arrangement is of particular value in making a landing. Elevation and depression of the machine in climbing or descending can be obtained either by changing the angle of incidence or by suitably arranged elevator flaps.

A further object of the invention is to produce a simple and inexpensive device and yet one which will be exceedingly effective for the purposes for which it is designed.

These objects, we accomplish by means of such structure and relative arrangement of the parts as will fully appear by a perusal of the following specification and claims.

On the drawings, similar characters of reference indicate corresponding parts in the several views.

Figure 1 is a side elevation of the complete aeroplane.

Fig. 2 is a front elevation of the same.

Fig. 3 is a diagrammatic outline of the controls for the interplane ailerons and of the steering rudders and rear steering wheels.

Fig. 4 is an outline view of the controls for varying the angle of incidence of the main lifting planes.

Fig. 5 is a perspective view of the machine in flight.

Fig. 6 is a view similar to Fig. 5 showing a modified form of interplane structure.

Referring more particularly to the characters of reference on the drawings, the numeral 1 designates the main body of the machine which is of a cigar or other streamline shape to render it easily dirigible. This body is mounted on front and rear supporting wheels 2 and 3 of desired size and shape. It will also be made very light and so shaped as to offer the least possible resistance while being propelled forward either on the ground or through the air.

The front wheels 2 are arranged to be driven by a chain 4 which may be placed into or out of driving relation with the engine driven shaft 5 by any one of the numerous clutches common in the art (not here shown or described). The rear wheels 3 are mounted to be dirigible and may be steered in any direction desired by means of a cable 6 which is wound around a drum 7 on the steering post 8 which has the hand wheel 9 adjacent the driver's seat 10.

The body 1 need not have a chassis or frame but may be braced and trussed to the lifting plane structure in such a manner as to support same when the machine is on the ground in addition to carrying the engine, fuel and passengers.

To the body we pivotally attach the lifting plane structure. This consists of two biplanes arranged in tandem. One is pivotally mounted on the body immediately over the front end. This consists of a top lifting plane 11 and a bottom plane 12 spaced therefrom. These planes are provided with the usual camber and are held apart and braced by upright struts 13, by end curtains 14, and by our improved interplane structure which will be described at length hereafter.

The rear tandem plane embodies parts 11a, 12a, 13a and 14a, identical with the parts 11, 12, 13 and 14.

The pivotal connection between the lifting planes and the body is accomplished by pivoting the forward end of the lower planes 12 and 12a at points near the upper side of the body 1 as at 12b and 12c (see Figs. 4 and 5). This permits both biplanes to be angled forward or backward to attain the right degree of the angle of incidence. This movement is imparted by means of suitable controls (see Figs. 1 and 4) which we will now describe. Connecting cross bars 15 pivotally connect with the rear of the plane 11 and with the front of the plane 11a. A cable 16 connects with the rear of the plane 11 and extends over a pulley 17 on the body 1, thence over a drum 18, thence under a pulley 19 and to connection with the front end of the plane 11a. The steering post is pivotally connected as at 8a and has a projecting arm 8b connected by a push rod 20 with an arm 18a on the drum 18. The tilting of the steering post 8, therefore, will actuate the drum to pull on the cable 16 and thus on the biplanes to alter the angle of incidence of each of them in the same relative degree with respect to the body 1. This can, therefore, be done without affecting the horizontal position of the body 1 which should always be kept level. Thus whether on the ground or in the air, the passengers may always sit in a normal position and likewise the load will always be maintained in a state of equilibrium. This ability to change the angle of incidence, in the particular manner noted, will obviate the use of elevating rudder sections now commonly used on standard types of aeroplanes.

The feature of having the two biplanes arranged in tandem and quite some relative distance apart, as shown, causes each to furnish its quota of lifting power from its particular position in relation to the structure. These following surfaces, as expressed in tandem arrangement, will when in motion have a fair degree of inherent or automatic stability which will obviate the necessity of balancing arrangements as are now commonly used. This tendency to having an inherent or automatic stability is augmented by the fact that the body, with all of its load of engine, fuel and passengers, is suspended below the support surfaces and below the center of resistance of the structure while the same is in motion. This, therefore, serves to keep the whole structure in an upright position at all times, which will leave the full powers of the pilot to be used for other purposes than balancing the machine. This feature will also eliminate the necessity of the long course of training of pilots, which is now necessary in the standard types of aeroplanes. This same condition of balance is automatically held whether the device is in the air or on the ground.

As has already been stated, the successful commercial aeroplane must be narrow in width if it is to travel on ordinary roads. To that end, we shorten the length of the main lifting planes 11 and 12 and compensate for the loss of lifting surface occasioned by the shortening of such lifting planes by the insertion of our interplane structure which has already been mentioned several times. This interplane structure comprises the planes 21 which are set between the planes 11 and 12, and the planes 21$^a$ which are similarly arranged between the planes 11$^a$ and 12$^a$. These planes are set between the horizontal biplanes in alternate relation with respect to each other, and at an angle about 45° relative to the horizontal plane of the biplanes. The bottom edges of these interplanes 21 are straight, but such planes are each provided with a gradual change in incidence or inclination from their front to rear and toward their upper edge, as shown clearly in Figs. 2 and 5. This inclined structure causes the interstices or cells between the interplanes and biplanes to have varying cross-sectional areas from front to rear, as has been featured in Patent No. 1,195,290, and application for patent, Serial No. 97,533.

In the ordinary type of biplane, the fuselage or body which ordinarily carries the engine, fuel and passengers, is placed immediately above the lower plane and the propeller is generally attached to the front end of the fuselage so that when it revolves, there is a slip stream of air from the action of the propeller which is impelled against the fuselage or body, thus retarding its advance. In our type of aeroplane here shown, the body or fuselage is below the lower plane. It is, of course, desirable to have the propellers operate directly in front of the planes. Therefore, instead of placing a single propeller immediately in front of the body, we provide a pair of spaced propellers 22 located directly between the biplanes and also so positioned as to impel the air between the biplanes and interplanes. These propellers are suitably mounted and journaled and are arranged to be driven by belts 23 mounted in driving relation with the motor shaft 5 in any desired manner. By having our propellers thus positioned, the slip stream of air instead of striking against the body or fuselage is impelled directly through the biplanes, thus giving a buoyant effect to the structure instead of retarding its advance and this in fact doubles the lift when the propeller is at high speed.

The camber of the interplanes 21 can be such as is used in any aeroplane wing section and the angle of incidence to the advance of the planes will be such as is used on the horizontal planes to which the interplanes are attached. The action of the air pressure on the under side of each interplane will exert a compression lifting effect while the action of such air on the port side of said interplanes will exert a lift caused by the suction engendered by the greater curve of the upper portion of the interplane sections. The lower planes 12 and 12$^a$ will be provided with openings 24 of that type shown in our pending application for patent Serial No. 97,533, for the release of the compression of air caused by the cambered interplanes in such relative proportion as is found proper to control the aeroplane, as has been fully set forth in said above named application for patent.

At this point, it might be well to state that while the interplane structure here described provides the same feature of having box-like openings from the front to the rear of the biplane of greater cross-sectional area in front than at the rear, as shown in the previously mentioned patent and application for patent, still this present arrangement of the interplanes refines this general principle, whereby we gain both the compression effect beneath the interplanes and the suctional lift above the same.

While we believe it highly possible that the cambered interplanes will properly perform the functions attributed to them, still these planes, instead of being cambered, may be simply bent downwardly toward their rear at the same angle for their entire length, as shown by the numerals 21$^b$ and 21$^c$, in Fig. 6. This same relative angle of the interplanes may be found desirable in practice to overcome any tendency to drag, which might be present with the cambered interplanes. This is a feature which we are now experimenting with and have not as yet settled to our entire satisfaction.

The above method of gaining lift by means of our improved interplanes must not be confounded with the lift developed by flat elongated struts sometimes set at an angle between the top and bottom planes to give a proper bracing effect. Our interplane structure, which of course acts as braces for the top and bottom planes, thus do away with a great deal of the use of ordinary struts now commonly employed. In the ordinary standard biplane, struts are used to keep the planes apart in proper relation. These struts offer a parasitic resistance as the speed increases. In our improved type of interplane structure, we have no strut resistance since the interplanes while serving the purpose of struts are of course lifting surfaces. The total resistance offered to the advance of the biplane is accordingly much reduced by our type of structure. The zig-zag frame to which the biplanes are inserted between the biplanes serve also to create a very compact and rigid structure of great strength. The useful or excess load which can be carried is much increased by our structure because the doubling of the lifting power is caused by the insertion of the interplanes without increasing the width. A plurality of upright vanes 25 are set at the top of the upper lifting planes 11 and similar vanes 25$^a$ are set at the top of the planes 11$^a$. These vanes are for the purpose of vamping out any tendency of the fuselage or body to swing in a pendulum-like manner due to its being supported below the center of resistance.

At the end of each vane 25 is a balanced rudder 26 and at the end of each vane 25ª is a similar rudder 26ª. A control cable 27 is properly connected with all of the rudders and thence around the drum 7, whereby through the medium of the steering post 8 the rudders may be directed to steer the craft, which directing of the rudders may be made in unison with the directing of the rear wheels 3. The upper ends of the outer interplanes 21 and 21ª, as at 30 and 30ª, may be made flexible and a control cable 28 may be suitably connected with all of these flexible ends and with a foot lever 29 whereby such flexible ends may be made flexible. Such flexible ends may be used as balancing ailerons.

As a matter of illustration of the benefits to be gained by our improved interplane structure, we will assume a biplane of our proposed type of an estimate width of fifteen feet; of a chord or width of about three feet three inches, with a gap between the planes of four and one-half feet. This gap will leave a space for four of our cambered or inclined interplanes of six feet in length and set at an angle of 45° into the form of the letter W. The undersides of these interplanes exert a lifting effect, as do likewise the upper sides as the machine is propelled through the air. By this structure, we have a gain of a length of twenty-four feet of lifting plane surface which we add to the ordinary biplane structure without increasing its width. As each interplane set at an angle of 45°, exerts a lift of about 70% of what it would in a horizontal position, we produce a structure which has only 45% of the width of a simple biplane type, but it will lift the same weight. This principle of doubling the lifting ability of the machine without increasing the width secures us a commercial aeroplane which can be used on ordinary roads and then by placing two of these biplane-interplane structures in tandem so as to give automatic stability, we again have a doubling of the lift without adding to the width and even then the length of the machine need not exceed the width. The pressure relieving openings 24 permit us to reduce the sustaining surface as the speed increases so that the total resistance of the sustaining surfaces shall remain the same even as the speed increases. This gives us a large range of speed with the use of a comparatively small motor. We have not here shown the means of controlling the size of said openings since almost any desired means may be used, the preferred form being shown in our pending application for patent, Serial No. 97,533, as above.

Engineering reports on our type of aeroplane give us a rising speed of twenty-fiv miles per hour at a 14° angle of incidence forty miles per hour at a 7° angle of inci dence; and from fifty to one hundred mile per hour at a 4° angle of incidence. Th ability to use the lower angle at all speed above fifty miles per hour is secured by th pressure relieving openings 25 in propor tion as the speed increases.

From the foregoing description, it wil readily be seen that we have produced suc a device as substantially fulfils the object of the invention as set forth herein.

While this specification sets forth in de tail the present and preferred constructio of the device, still in practice, such devia tions from such detail may be resorted to a do not form a departure from the spirit o the invention as set forth herein.

Having thus described our inventior what we claim as new and useful and desir to secure by Letters Patent is:—

1. An aeroplane combining verticall spaced supporting surfaces, and interplan lifting surfaces arranged lengthwise of th aeroplane between the lifting surfaces i transverse vertical zigzag alinement ther between, the ends of the outer ones of suc interplane surfaces being flexible and adap ed for swinging movement transversely c the aeroplane.

2. An aeroplane combining a plurality c vertically and longitudinally spaced sup porting surfaces, an interplane lifting su faces arranged lengthwise of the aeroplar between each pair of vertically spaced su faces in transverse vertical zigzag alin ment therebetween, the ends of the out ones of such interplane surfaces being fle ible and adapted for swinging movemer transversely of the aeroplane, with a mear common to all such flexible ends for movir the same at the will of the aviator.

3. An aeroplane containing longitud nally and vertically spaced lifting surface and cambered interplane lifting surfac interposed in the vertical spaces between tl lifting surfaces.

4. An aeroplane containing lifting plan spaced apart vertically, and cambered inte plane lifting surfaces interposed betwee the planes.

5. An aeroplane combining a plurality vertically and longitudinally disposed su porting surfaces, and cambered interpla lifting surfaces arranged therebetwee such interplane surfaces being angular disposed in vertical zigzag arrangement tl full width of the longitudinal surfaces.

6. An aeroplane combining a plurality vertically and longitudinally disposed su porting surfaces, and interplane lifting su faces arranged therebetween, such inte plane surfaces being angularly disposed t tween the longitudinal surfaces, and cambered and inclined from front to rear to alter the cross-sectional area of the cells.

7. An aeroplane comprising biplanes arranged in tandem, a body suspended below the same, and vertical vanes projecting from the top of each biplane to damp out any pendulum like swing of the body, and a rudder pivoted to each vane and in alinement therewith, with a means, common to all the rudders, to steer the same.

In testimony whereof we affix our signatures in presence of two witnesses.

CALVIN PEARSON.
GEORGE C. ST. LOUIS.

Witnesses:
 VERADINE WARNER.
 BERNARD PRIVAT.